United States Patent [19]

Pagay et al.

[11] 4,331,498

[45] May 25, 1982

[54] METHOD OF AND APPARATUS FOR WRAPPING TOPS OF BOTTLES WITH FOIL

[75] Inventors: Roger Pagay, Lyons; Georges Tavernier, Villevrbanne, both of France

[73] Assignee: Societe Nouvelle Baele-Gangloff Societe Anonyme, Villeurbanne, France

[21] Appl. No.: 146,329

[22] Filed: May 2, 1980

[30] Foreign Application Priority Data

May 3, 1979 [FR] France ............................... 79 11807

[51] Int. Cl.³ ............................................. B32B 35/00

[52] U.S. Cl. .................................... 156/256; 156/353; 156/354; 156/517; 156/521; 156/556; 156/567; 156/568

[58] Field of Search ............... 156/256, 353, 354, 517, 156/521, 556, 548, 567, 568, DIG. 12, DIG. 14, DIG. 16, DIG. 28, DIG. 33, DIG. 34, DIG. 35; 126/38, 39, 40, 41; 226/114; 64/30 R, 30 C

[56] References Cited

U.S. PATENT DOCUMENTS

| | | | |
|---|---|---|---|
| 2,650,823 | 9/1953 | Chambon | 226/114 |
| 3,006,296 | 10/1961 | Penman | 226/114 |
| 3,555,764 | 1/1971 | Dowliy | 156/568 |
| 3,567,559 | 3/1971 | Dullinger | 156/571 |
| 3,608,804 | 9/1971 | Swansen | 226/114 |
| 3,707,423 | 12/1972 | Davies et al. | 156/517 |
| 3,756,042 | 9/1973 | Heth et al. | 64/30 C |
| 3,886,033 | 5/1975 | MacDonald et al. | 156/522 |

*Primary Examiner*—Caleb Weston
*Attorney, Agent, or Firm*—Karl F. Ross

[57] ABSTRACT

A band of foil is continuously pulled off a roll of the band and fed at a constant rate downwardly toward a station. The band is periodically deflected laterally from its path between the roll and the station so that the free end of the band in the station periodically stops completely. At the same time a succession of bottles is displaced transversely through the station, with one bottle being in the station each time the free end of the band stops. The free end of the band is pressed against the bottle in the station and is severed from the rest of the band each time the band stops in the station. Spots of adhesive are printed on the band on one face thereof upstream of the station and the deflector and advance rollers that engage this face downstream of the printing location only engage this face between the adhesive spots.

14 Claims, 6 Drawing Figures

METHOD OF AND APPARATUS FOR WRAPPING TOPS OF BOTTLES WITH FOIL

FIELD OF THE INVENTION

The present invention relates to a method of and apparatus for making foil blanks from an elongated band on a roll and applying these blanks to objects. More particularly this invention concerns an apparatus for wrapping the tops of bottles with foil.

BACKGROUND OF THE INVENTION

Various machines are known for applying pieces of foil or labels to objects such as bottles. See, for example, U.S. Pat. Nos. 2,631,748; 3,379,601; 3,555,764; 3,567,559; and 3,707,423 as well as French Pat. Nos. 1,125,650 and 2,205,040 and German Pat. No. 617,177. These machines all have the main goal of applying as many blanks—foil pieces or labels—to bottles as possible in a given time. Production speed must be as high as possible, while nonetheless maintaining good placement accuracy of the labels or foils on the bottles. Most of these machines are, however, extremely complex. They necessitate elaborate holding and conveying means for transferring and eventually positioning the blanks on the bottles prior to affixing of these blanks to the bottles or other objects. As the blanks themselves are normally provided with adhesive, conveying them from one location to another prior to applying them to the bottles is an extremely tricky operation.

It is also normally necessary to apply foil or labels to the bottles as they move along a conveyor path. Since it is, however, necessary for the labels to be applied to the bottles while they are standing still, it is necessary that the labels be formed discontinuously. In the case of a foil machine this problem is particularly difficult as the foil is normally delivered on a roll that, in effect, constitutes a solid block of metal. Various devices are known for pulling material continuously off a roll in an upstream location while being able to arrest it fully at a downstream location. See for example U.S. Pat. Nos. 2,557,416; 2,650,823; 3,006,296; and 3,608,804. Such arrangements have normally not been successfully integrated in blank-forming and blank-applying machines.

OBJECTS OF THE INVENTION

It is therefore an object of the instant invention to provide an improved method of and apparatus for making foil blanks from an elongated band on a roll and for applying these blanks to objects.

More specifically the invention aims at an improved system for cutting foil blanks off a band pulled continuously from a roll, for applying an adhesive to these blanks, and for wrapping these foil blanks about the tops of bottles.

A further object is to provide such an apparatus which is relatively simple in operation and, therefore, trouble-free, yet which can operate at high speed.

SUMMARY OF THE INVENTION

These objects are attained according to the instant invention in an apparatus wherein a pair of upstream rollers grips the band and is continuously driven at a constant peripheral speed to pull the band off its roll at this peripheral speed and advance this band downstream along a vertical band path to a pair of downstream rollers that also grip the band. The downstream rollers are driven through a slip clutch, which may be of the type described in U.S. Pat. No. 3,756,042, so that they are urged into rotation at a peripheral speed substantially higher than that of the upstream rollers, but so that they nonetheless can stop completely if the band gripped between them stops. A glue-applying roller is provided between these upstream and downstream pairs of rollers for applying adhesive to one face of the band in spots spaced apart on this one face transversely to the travel direction of the band and along the band path. That one of the downstream rollers that engages this one face is formed with ridges so that it only engages this one face between the glue or adhesive spots. In addition a deflector which is also engageable with this band between the upstream and downstream rollers but also on the one face between the adhesive spots serves to periodically deflect the band laterally between the upstream and downstream rollers perpendicular to the travel direction and thereby periodically stops the band at the downstream rollers.

As the deflector pushes the band between the two rollers so as to take up the band as it comes from the upstream rollers and to arrest it at the downstream rollers two main things happen. First of all a cutter that is operable synchronously with the deflector and is positioned downstream of the downstream rollers moves across the band at the path when it stops to cut a blank from it. Simultaneously a holder presses this blank at approximately the same time as it is cut from the band against the neck of an object, such as bottle, which is positioned in an applicationn station on the band path immediately downstream of the downstream rollers. A succession of these objects is, in fact, displaced through this station, with the conveyor means for displacing this succession of objects being operated synchronously with the deflector and cutter so that one object is positioned in the station each time the band stops at the station, while a blank is being cut from it. Finally means is provided along an object path defined by the conveyor for the objects downstream of the station for wrapping blanks tightly around the object that is transported away from this station.

Thus the band pays continuously off its roll at a constant speed, and is continuously provided on one face with glue spots. At a downstream location the deflector periodically stops the band at the downstream rollers so that at the same time a cutter can cut a blank loose from the band and a holder can press the thus formed blank against the top of an object in the application station. The whole sequence of events is synchronous so that an extremely high production rate can be obtained.

According to further features of this invention the glue spots are also spaced apart longitudinally, that is in the direction of transport of the band. The cutter is a knife or blade which is operated synchronously with the glue-applying rollers so that it cuts the band through between the glue spots, that is in the transversely extending zone between adjacent glue spots. Thus the knife does not touch the adhesive itself and will not become fouled. In addition the knife can, according to the instant invention, be held in a guide spaced from the band by a distance equal to substantially more than the stroke of the blade, and the blade can be tipped down toward the band so that any glue that does accumulate on the blade will not work its way back into the guide.

SPECIFIC DESCRIPTION

Figure 1:
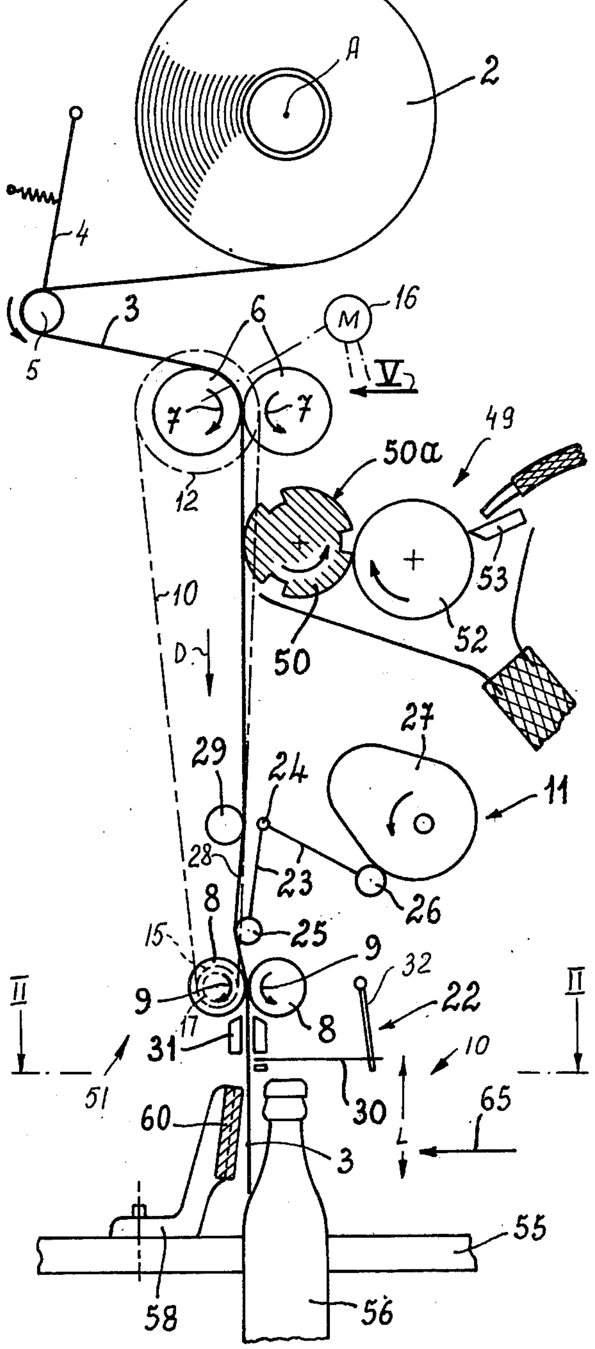
FIG. 1 is a side partly schematic view showing the apparatus for carrying out the method according to the instant invention.

As seen in FIGS. 1-5 a roll 2 journaled for rotation about a horizontal axis A is wound with an aluminun band 3, having a thickness of 8 microns. The band 3 is fed off the roll 2 over a roller 5 carried on a spring-loaded arm 4 that serves to take up the inertia of starting and stopping. Downstream of the roller 5 the band 3 passes between a pair of upstream pinch rollers 6 which are geared together and driven by a motor 16 to rotate in opposite senses as shown by arrows 7.

One of the rollers 6 carries a sprocket wheel 12 connected via a chain 10 to a shaft 15 carrying one of two rollers 8 connected together for rotation in opposite directions as shown by arrows 9. One of these rollers 8 is formed of a steel core rotatable on the shaft 15 and carrying an elastomeric cover. A friction pad is pressed against the end of this core by an annular plate rotationally linked by axial rods to an element keyed to the shaft. Springs ensure a predetermined degree of axial coupling between the shaft 15 and the one roller 8 so as to form a slip clutch 17. The sprockets of the rollers 6 and 8 are so dimensioned that the rollers 8 when not resisted turn at a substantially higher peripheral speed than the rollers 6. In this manner the stretch 28 of band 3 between these pairs of rollers 6 and 8 will always be maintained tight.

Figure 3:
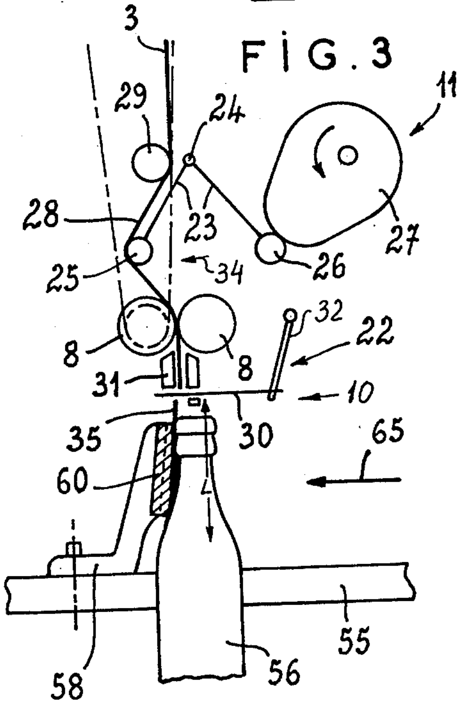
FIGS. 3 and 4 are views of details of FIG. 1 showing the apparatus in other positions.
Figure 4:
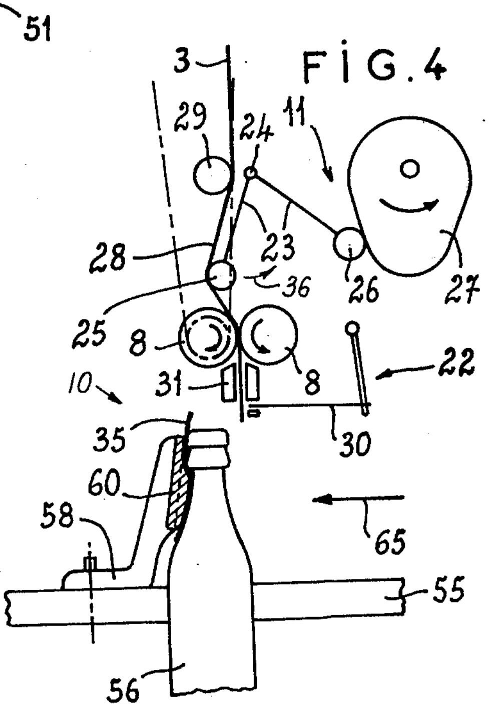

Tangent to the vertical plane extending between the nips of these rollers 6 and 8 is an idler roller 29. On the other side of this plane is the fixed horizontal pivot axis 24 of a two-armed lever 23 having one arm carrying a roller 25 engageable with this stretch 28 of band 3 between rollers 6 and 8 and another arm carrying a cam-follower roller 26 riding on a single-lobe cam 27 also driven by the motor 16. Together these elements form a feed device 11 that functions as follows:

The rollers 6 and the cam 27 are rotated at constant angular velocities so that the band 3 is pulled off the roller 2 with a constant speed. The band 3 thus passes the idler roller 29 at a constant speed. As the cam 27 rotates, however, it forms as shown in FIG. 3 a bight at the stretch 28 between the rollers 29 and 8. Thus as the cam rotates the roller 25 is displaced in the direction of arrow 34 to form a bight which is small, as shown in FIG. 1, but which then increases to maximum size as shown in FIG. 3. The roller 25 then returns as shown by arrow 36 in FIG. 4 and the bight decreases in size until the roller 25 pulls altogether away from the stretch 28. Since the rotation rate of the rollers 8 is much higher than that of the rollers 6, the stretch 28 will be pulled straight so that the band 3 will follow a straight path from the roller 29 to the nip of rollers 8 when not engaged by the roller 25.

Figure 5:
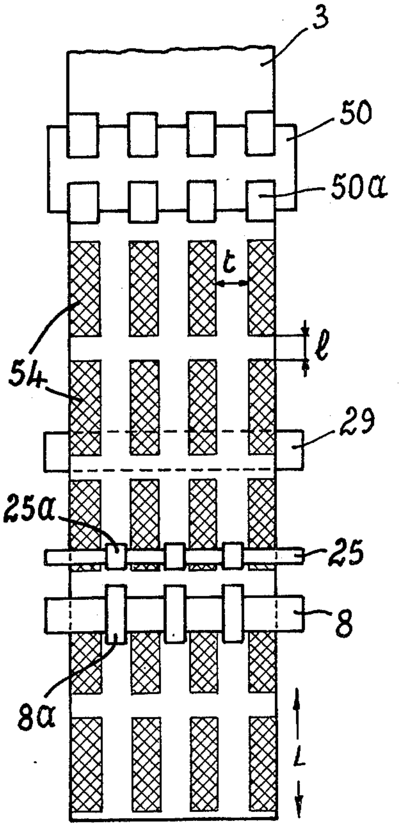
FIG. 5 is a view taken in the direction of arrow V of FIG. 1.

Above the arrangement 11 is a gluing station or device 49 comprising a three-lobe gluing roller 50 to which glue is supplied from a roller 52 associated with a doctor or scraper blade 53. The lobes 50*a* of the roller 50 therefore form as shown in FIG. 5 glue spots 54 on the one face of the band 3. These spots are spaced apart in the displacement direction D by a distance l and transverse to this displacement direction by a distance t. The rollers 8 and 25 that engage the glued side of the band 3 have, as shown in FIG. 5, rings or ridges 8*a* and 25*a* which engage between these spots 54 to prevent these rollers 8 and 25 from becoming gummed up.

Below the arrangement 11 in a station 10 is a cutter 22 which comprises a guide 31 for a blade 30 and for the band 3. The blade 30 is carried on an arm 32 reciprocated by a crank driven by the motor 16 so as to reciprocate back and forth across the continuation of the vertical plane of the path of the band 3. The cutting action of this blade 30 is so timed that it cuts the band 3 at just the moment when the deflection by the roller 25 causes the rollers 8 to stop rotating, that is when the growth of loop 28 is equal to the feed rate and the slip clutch 17 allows the rollers 8 to stop completely. Thus the band 3 is not moving at this instant so that a blank 35 having a length L can be cut from it. In addition the cut is formed in the glue-free zone between the spots 54 to keep the cutter blade 30 clean.

Figure 2:
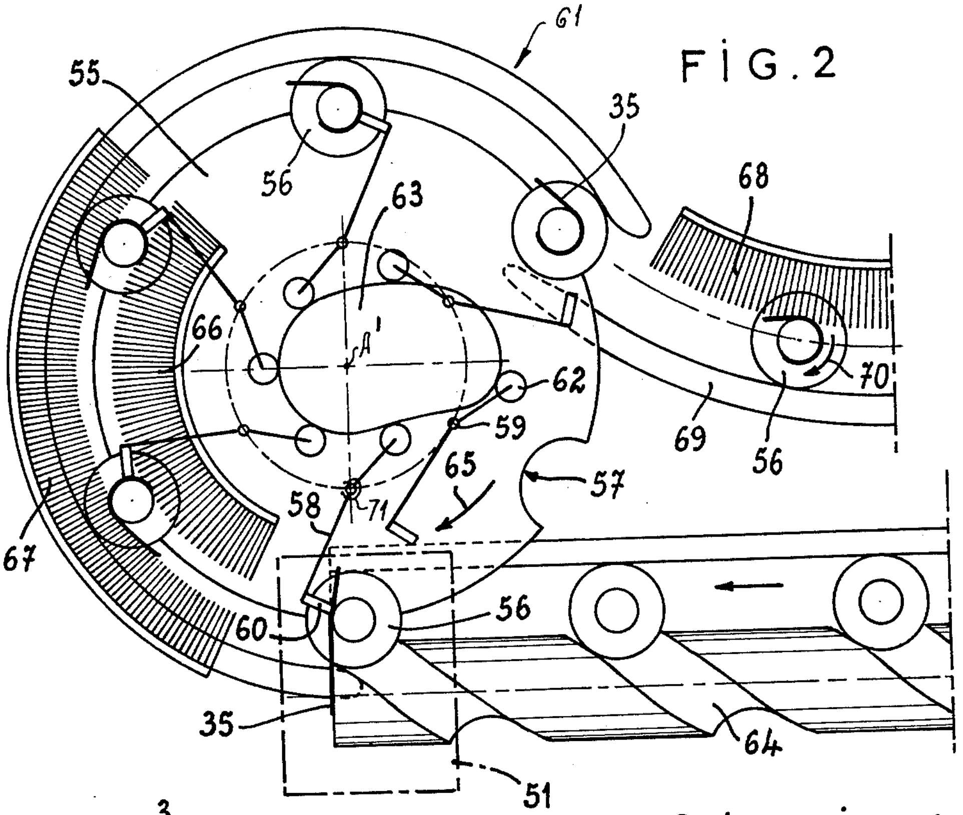
FIG. 2 is a section taken along line II—II of FIG. 1.

The feeder 11 and cutter 22 together constitute a blank-forming apparatus 51 which is positioned directly above a label-applying arrangement 61 shown in FIG. 2. Receptacles, here bottles 56, are fed to a carrousel or starwheel 55 of this arrangement 61 by a continuously rotating conveyor screw 64 that automatically places the lower portions of these bottles 56 in outwardly open notches or seats 57 formed in the starwheel 55, that itself is continuously rotated about a vertical axis A' by the motor 16 in the direction indicated by arrow 65.

Associated with each notch 57 is a two-armed spring lever 58 pivoted at 59 on the wheel 57 and having an outer end formed with a soft elastomeric pusher or holder 60 and an inner end constituted as a cam-follower roller 62. Nonrotatable relative to the axis A at the center of the starwheel 55 is a single-lobe cam 63 on whose periphery ride the levers 58 which are provided at their pivots 59 with torsion springs 71 that urge them in a counter-clockwise direction, as seen in FIG. 2, to normally pull their pushers 61 toward the respective notches 57. The cam 63 is so oriented that the pusher 60 will engage against the neck of the respective bottle 56 at the exact instant when a blank 35 produced as described above is positioned at this neck and cut off.

Once the blank 35 has been cut from the band 3 and is held by the pusher 60 against the neck of the bottle 56, rotation of the wheel 55 in the direction of arrow 65 will bring this neck between an inner brush 66 and an outer brush 67 which both occupy a little more than a quadrant centered on the axis A'. These brushes 66 and 67 press the blank 35 into tight engagement with the neck of the respective bottle to adhere it thereto.

After traveling around the wheel 56 through approximately 270° each of the bottles 56 is released onto a track 69 adjacent yet another brush 68 that is fixed. At the same time the cam 63 pulls the pushers 60 against the force of their springs 71 away from the bottles. The track 69 is formed of an elastomeric material with a high coefficient of friction so that the bottles 56 will roll as indicated by arrow 70 along the brush 68. This rolling action ensures complete pressing of the blanks 35 to the necks of the bottles 56 all around these necks. The result is an extremely good adherence at all locations.

Figure 6:
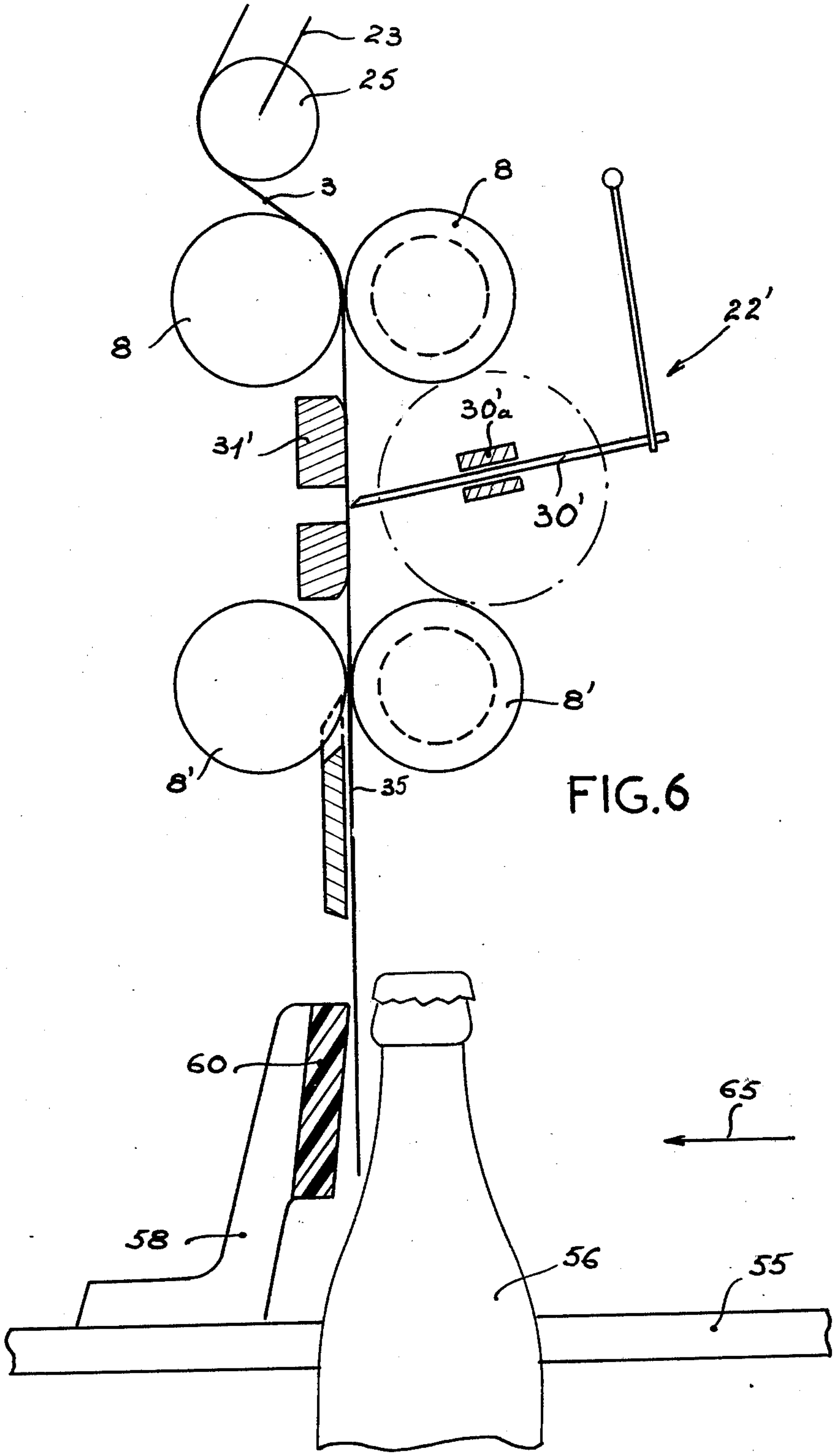
FIG. 6 is a view similar to FIG. 1 showing another arrangement according to the present invention.

FIG. 6 shows an arrangement similar to that of FIG. 1 and using like reference numerals for structurally similar elements. Here, a second pair of rollers 8′ coupled for joint and synchronous rotation with the rollers 8 is provided slightly below these rollers 8. A guide 31′ for a long cutter blade 30′ is provided between the rollers 8 and 8′, and the cutter 30′ is carried on arm 22′ and guided at a relatively long distance from the band 3 through its own guide 30′*a*. With such an arrangement the stroke or length of travel of the blade 30′ perpendicular to the band 3 is smaller than the spacing between the guide 30′*a* and the band 3 to prevent glue on the band 3 from building up on the guide 30′*a* and the blade 30 is tipped down toward the band 3 to prevent glue from flowing along it. Normally this blade 30′ is of the serrated type and does not reciprocate far enough to cut all the way through the foil band 3 all along its length, but instead forms a row of long perforations. The blank 35 is ripped from the band 3 when its end is pinched between the pusher 60 and the neck of the bottle 56 which, when it moves away in direction 65, will tear the blank 35 from the rest of the foil band 3.

With the system according to the instant invention, therefore, the band and the blank are positively held at all times. The time between the instant when the adhesive is applied to the band 3 and that at which the blank 35 is applied to the bottle 56 is also very short, so drying-out of the adhesive is impossible. It is therefore possible to operate at extremely high speed while nonetheless positioning the pieces of the strip 3 on the bottles 56 with considerable accuracy. At no time is the blank 35 not held between two elements. In the arrangement of FIG. 1 the blade 30 does not reciprocate across the path of the band 3 until the free end of the band 3 is pressed by one of the pushers 60 against the neck of a bottle 56. Only at this time is it cut free, so that incorrect positioning of the blank 35 is virtually impossible. In fact the machine according to the instant invention operates so very accurately that it can be used for applying labels as well as for wrapping foil around the top end of a bottle.

It is, of course, possible for the band 3 to be other than of metallic foil, it can be an indicia-bearing strip. The articles receiving the blank 35 need not be bottles, but can be virtually any other rigid object.

We claim:

1. An apparatus for making foil blanks from an elongated band on a roll and for applying said blanks to objects, said apparatus comprising:
- a pair of upstream rollers gripping said band;
- drive means connected to said upstream rollers for rotating same at a constant peripheral speed and thereby pulling said band off said roll at said speed and advancing said band downstream along a band path;
- means including a glue-applying roller downstream of said upstream rollers for applying adhesive to one face of said band in spots spaced apart on said one face transverse to the travel direction of said band along said band path;
- a pair of downstream rollers gripping said band downstream of said glue-applying roller, one of said downstream rollers engaging said one face only between said spots;
- means including a deflector engageable with said band between said glue-applying roller and said downstream rollers on said one face only between said spots for periodically deflecting said band between said upstream and downstream rollers perpendicular to said travel direction and thereby periodically stopping said band at said downstream rollers;
- means including a slip clutch between said downstream rollers and said drive means for urging said downstream rollers into rotation at a peripheral speed substantially greater than that of said upstream rollers and for permitting said downstream rollers to stop rotating completely when said band stops at said downstream rollers;
- means including a cutter operable synchronously with said deflector and downstream of said downstream rollers for cutting through said band when same stops at said downstream rollers, and thereby forming a blank;
- means operating synchronously with said cutter and deflector for conveying said objects through a station on said band path immediately downstream of said downstream rollers along an object path passing transversely through said band path at said station with one object being positioned in said station each time said band stops thereat;
- means including a holder engageable with the blank in said station and therethrough with the object therein for pressing said blank against said object when said band stops and said cutter cuts through said band; and
- means along said object path downstream of said station for wrapping said blank tightly around said object as same is transported away from said station.

2. The apparatus defined in claim 1 wherein said glue spots are also spaced apart in said one face of said band longitudinally in said direction, said means including said cutter displacing same synchronously with said deflector so that said cutter engages said band only between said glue spots.

3. The apparatus defined in claim 1 wherein said one of said downstream rollers is formed with circumferential ridges engaging said one face between said spots.

4. The apparatus defined in claim 1 wherein said cutter is a blade reciprocal across said band path.

5. The apparatus defined in claim 4 wherein said means including a cutter includes a guide in which said blade rides, said guide being spaced from said band path by a distance equal to substantially more than the reciprocation stroke of said blade.

6. The apparatus defined in claim 5 wherein said blade is inclined downwardly from said guide toward said band path.

7. The apparatus defined in claim 1 wherein said band path is vertical and said upstream rollers are above said downstream rollers, said path being straight.

8. The apparatus defined in claim 7 wherein said means for conveying said objects includes a wheel rotatable about a vertical axis underneath said cutter and defining an object orbit constituting part of said object path centered on said axis.

9. The apparatus defined in claim 8 wherein said wheel has a plurality of object-receiving seats spaced angularly about said wheel, said wheel being provided one such holder for each of said seats, said means including said holder also including cam means for displacing said holders toward the respective seats at said station and for displacing said holders away from the respective seats at a location on said object path downstream from said station.

10. A method of making foil blanks from an elongated band on a roll and for applying the blanks to objects, said method comprising the steps of:

continuously pulling said band from said roll at a constant speed and advancing said band along a band transport path toward a station;

applying an adhesive in spots to one face of said band upstream of said station;

periodically laterally deflecting said band from said path between said station and said roll so as periodically and momentarily to arrest the free end of said band in said station;

conveying a succession of objects transversely to aid path through said station with a one of the objects being in said station each time said free end is arrested in said station;

pressing the free end of said band in said station against the object in said station each time said free end is arrested in said station;

cutting through said band immediately upstream of said free end each time same is pressed against the object in said station to form a new free end and to leave the old free end as a blank pressed against the object in said station; and adhering the blanks to the respective objects as same are conveyed away from said station.

11. The method defined in claim 10 wherein said path is vertical and said band is advanced downwardly toward said station.

12. The method defined in claim 11 wherein said band is only partially cut through each time its free end is pressed against the object in said station, said method further comprising the step of tearing the partially cut-through free end of said band station away from said station while holding said partially cut-through free end against the object.

13. The method defined in claim 10 wherein said blanks are adhered to the respective objects by being tightly wrapped therearound.

14. The method defined in claim 10 wherein said adhesive is applied to said one face before deflecting of said band from said path but after pulling said band from said roll.

* * * * *